March 7, 1939.  C. B. CRONAN  2,149,728
UNIVERSAL BEARING SUPPORT
Original Filed June 27, 1933
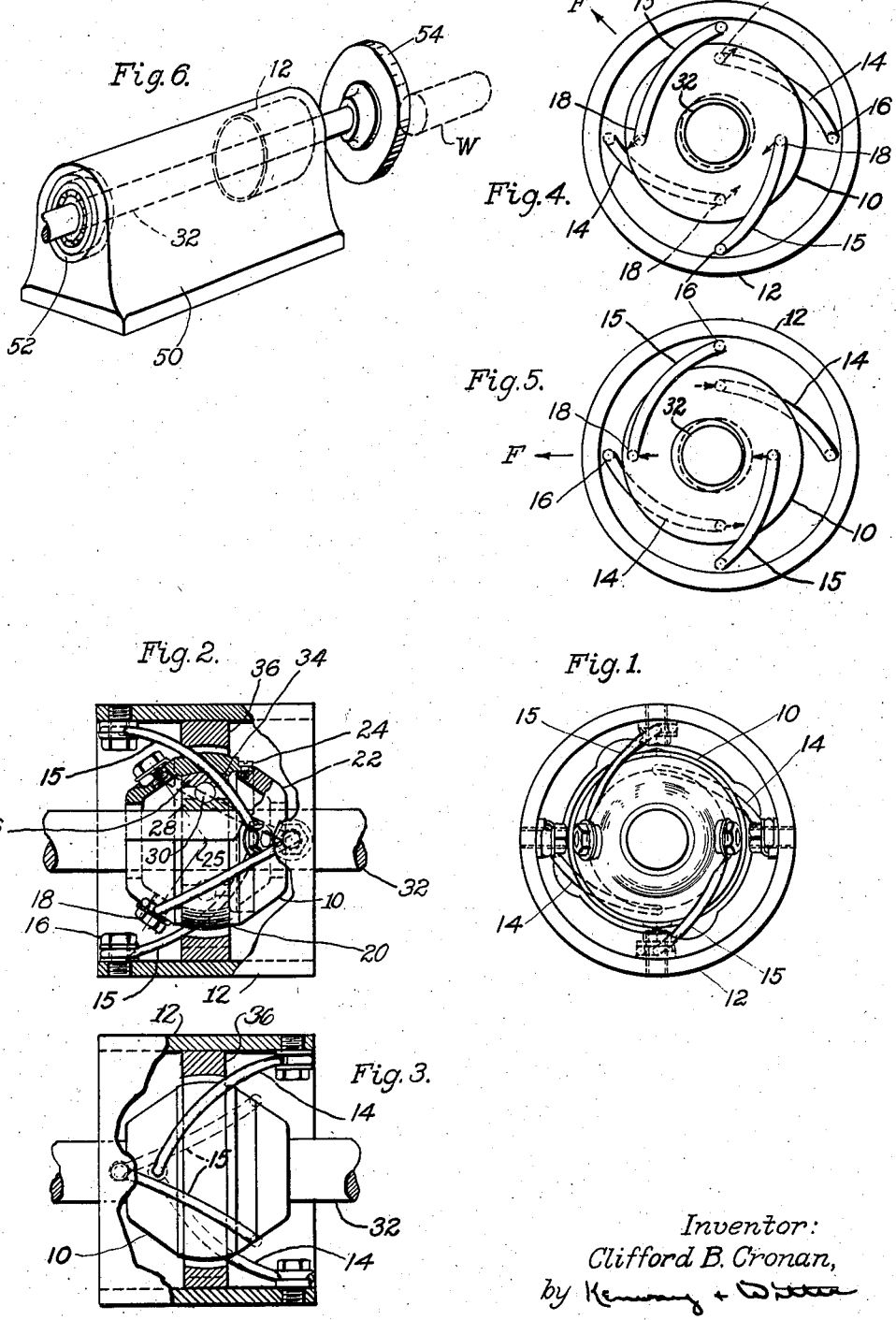
Inventor:
Clifford B. Cronan,
by Kenway + Witter
Attorneys.

Patented Mar. 7, 1939

2,149,728

UNITED STATES PATENT OFFICE 2,149,728

UNIVERSAL BEARING SUPPORT

Clifford B. Cronan, Newtonville, Mass.

Application June 27, 1933, Serial No. 677,840
Renewed July 27, 1938

11 Claims. (Cl. 308—26)

This invention relates to universal bearing supports and more particularly to a combination of elements for supporting a bearing or the like for universal movement from a normal position, said elements including resilient means for resisting movement of the bearing from the normal position. The desirability of a mechanism of this nature has long been apparent and various attempts have been made to provide the same. Such attempts with which I am familiar include, more commonly, the use of compression springs located radially in a plane about the bearing and against which any force acting to displace the bearing must function. These mechanisms have been inefficient and unsatisfactory for various reasons among which may be mentioned the following. The resistance to movement of the bearing in different radial directions is not uniform and the extent of such movement is relatively great and variable; a portion only of the resilient elements function at any one time and then in a manner varying in accordance with the direction of the applied force; and the resisting forces, being always in fixed and definite directions, cause the development of undesirable vibrations and chattering in the bearing, especially when the shaft therein reaches certain predetermined speeds. The primary object of my invention is the production of an improved mechanism for supporting a bearing or the like wherein these objections are substantially eliminated.

My improved bearing support embodies the use of a plurality of resilient elements attached to and supporting a ring-like member normally in a centrally disposed position and resisting movement thereof in any direction from that position. The elements are all of equal strength and size and are uniformly attached to the member whereby to support the same uniformly against movement in any radial direction in space. The arrangement is furthermore such that any force tending to displace the member laterally or axially is resisted simultaneously by all of said elements, this resistance being constant regardless of the direction of the force, thus offering a uniform resistance to movement of the bearing in all directions, whereby is provided a balanced bearing support and one capable of universal movement about said centrally disposed position.

The said resilient elements of my improved bearing support are also preferably so mounted that any force moving the supported and supporting member radially or laterally also gives a slight compound rotative movement to the member, this latter movement being equally resisted by all of said elements and acting not only to increase the resistance to radial displacement of the member but also to cut down the extent of such radial displacement by any given force. It may also be briefly stated that the attachment of the elements to the member is of such nature that the direction of these rotative movements changes with the change of direction of the applied force, thus producing a damping effect which quite eliminates the development of objectionable vibration and chattering heretofore present in bearing supports of this general nature.

The production of an improved universal bearing support of the nature above and hereinafter defined comprises a further object of my invention.

These and other features of the invention will be best understood and appreciated from the following description of a preferred embodiment, selected for purposes of illustration and shown in the accompanying drawing, in which Fig. 1 is an end elevation of one form of my improved bearing support;

Fig. 2 is a side elevation thereof partially broken away;

Fig. 3 is a plan view of Fig. 2;

Fig. 4 is a somewhat diagrammatic end view showing the inner bearing support moved laterally by the force indicated by the arrow;

Fig. 5 is a view similar to Fig. 4 but showing the force acting in another direction;

Fig. 6 is a perspective view of a grinding and polishing unit showing one application of my invention.

In Fig. 1, I have illustrated my improved universal bearing support as embodying an inner ring-like member 10 supported on and within an outer ring-like member 12 by means of a plurality of resilient elements attached to the two members. In the preferred form illustrated, there are two pairs 14 and 15 of diametrically opposed elements, each element comprising resilient high grade steel wire or the like provided with eyes at the ends for engaging anchoring studs. The outer ends of the elements are supported by studs 16 threaded outwardly into the member 12 and the inner ends are attached to the member 10 by studs 18 threaded thereinto. The pair of elements 14 is attached to one end of the member 12 and to the opposite end of the member 10, and the pair 15 is attached to the relatively opposite ends of the members and located 90° from the pair 14 around the longitudinal axis of the members. The elements have their inner ends attached to the member 10 at opposite sides of the central point 25 and adjacent to the two ends thereof and at relatively spaced and symmetrically disposed points therearound. Furthermore, the elements extend in helix-like lines or paths between and relative to the two members and at such an angle that the two ends of each element are located 90° apart around the longitudinal axis of the members when the members are in normal position.

The member 10 may comprise an intermediate body portion 20 and two bevelled side or end portions, the studs 18 being threaded into these bevelled end portions. One end portion 22 is also preferably a removable piece adapted to be secured to the body portion by screws 24, whereby to permit the insertion of a shaft bearing into the member 10. This shaft bearing comprises outer and inner rings or races 26 and 28 with ball bearings 30 therebetween, the race 28 being adapted to receive and support a shaft 32 extending outwardly through the ends of the member 10. The member 10 and outer race preferably have cooperating spherical bearing surfaces 34 which permit universal movement of the shaft bearing on and within the member 10. A guard ring 36 anchored to the inner surface of the member 12 and surrounding the member 10 is adapted to limit lateral movement of the member 10 from normal position, as and for the purpose hereinafter described.

It will be noted that the improved bearing support illustrated and described herein is entirely symmetrical and that the inner member 10 is supported at four symmetrically located points by like resilient elements also symmetrically located and anchored. As thus supported, the member 10 must normally occupy a position centrally disposed within the member 12. Furthermore, since the member 10 is equally supported by the elements 14 and 15, any force tending to displace the member 10 from normal position must act against and deflect all of said elements. Thus, a force acting laterally against the shaft 32 will meet a definite resistance, regardless of the directiton of the force, and such resistance is at all times supplied simultaneously by all of the elements 14 and 15.

Furthermore, due to the helical arrangement of the elements 14 and 15, any lateral displacement of the member 10 will cause this member to define a compound rotative or revolving movement, this movement also acting against and being resisted by all the elements 14 and 15. Thus it will be seen that any force tending laterally to displace the shaft 32 is not only resisted by a resulting displacement of all the helical elements caused by lateral movement of the member 10 but is also resisted by a resulting displacement of said elements in a direction to rotate the member 10. The spring elements, therefore, cooperate to build up a strong and resilient resistance to movement of the bearing support from normal and this resistance remains constant for all directions of the applied force.

In a bearing support of this nature, it is highly desirable that the same should be so constructed as to be deflected laterally in the direction of the load a minimum distance from its normal position. This useful result is accomplished by the combined lateral and rotary deflections of the member 10 and its spring elements 14 and 15. The amplified resistance offered to lateral movement of the member cuts down the lateral deflection thereof in the direction of and for any given load and the resulting rotation of the member furthermore causes lateral deflection thereof in a relatively angular direction as illustrated and described in reference to Figs. 4 and 5, this relatively angular deflection further diminishing the deflection in the direction of the load as hereinafter described. Were only lateral deflection of the springs depended upon and were the entire deflection of the 10 member to be in the direction of the applied load, the member would be further deflected laterally for a given load and thus cause the bearing to move further from its normal center each time a load is applied, whereas one object of the invention is to cut down this movement.

Attention is called to the fact that the direction of the rotative movement of the member 10 changes with the change of direction of the applied force or load. This change in the direction of rotative movement of the member serves the very useful purpose of eliminating undesirable vibration and chattering, any such objectionable tendency being damped out by these directional changes which take place in the movements of the member. It should also be noted that the improved bearing support, and especially the elements 14 and 15, furthermore act to locate the shaft axially and serve to eliminate undesirable longitudinal vibrations thereof.

In Fig. 4 I have illustrated the action which takes place when a force F is applied to the shaft 32. Such a force, acting through and moving the member 10 in the direction of the force, displaces the elements 14 and 15 laterally and causes certain of the anchored ends 18 to approach their fixed ends 16, and the other ends 18 to recede from their fixed ends 16. Were the member 10 not permitted to rotate within the member 12, the spring elements would need to buckle or be straightened out to compensate for these variations. However, the member being free to rotate, a portion of the compensation is performed by such rotation and the remaining portion thereof is taken up by a change in the form or position of the elements.

The force F applied to and moving the member 10 in the direction indicated in Fig. 4 sets up forces indicated by the arrows at 15–18 whereby the near end of the member 10 is tipped or rotated in the direction of such arrows. In like manner, forces in the opposite direction are set up at 14–18 to cause the far end of the member to move in the opposite direction. Thus a rotative or tilting movement is given to the member 10 whereby the ends thereof are deflected laterally in a direction right angularly to the load. Thus the member is deflected rotatably and laterally while permitting only a relatively slight deflection of the member and its shaft in the direction of the load.

In Fig. 5, the load F is illustrated as applied in a direction through the anchoring points 16 and 18. This action causes the near end of the member 10 to move in the direction of the load and the opposite end thereof to move in the opposite direction. The result of these movements is such that the shaft 32 is moved a distance equal to only one-half of the algebraic sum of the movements of the two ends of the member and the extent of this movement is the same in Figs. 4 and 5 and is, in fact, independent of the direction of load. It should also be noted that, as the direction of the force F in Fig. 4 is moved toward the direction of the force F in Fig. 5, the tilting or rotating of the member 10 changes its direction toward that shown in Fig. 5. Thus, the directions of movements given to the member 10 vary or change with the directions of the applied loads and such changes serve to damp out any undesirable vibration or chattering which might otherwise develop. While the exact motion of the member 10 is quite complicated and not known under certain conditions of operation, the longitudinal axis of this member is believed to generate an hyperboloid of revolution.

The guard ring 36 serves several purposes. It limits the lateral movement of the member 10 from normal position to the maximum amount permissible for given operating conditions; prevents overstressing of the elements 14 and 15; and in case of failure of these elements, it would serve as a safety guard ring preventing damage to the equipment.

In Fig. 6 I have illustrated one application of my invention to a grinding or polishing wheel. The shaft 32 may be supported on a pedestal 50 by means of two of my universal bearing supports or by one such support, indicated at 12, and by a self-alining bearing 52. The shaft may be driven by any suitable driving means applied to one end thereof and a grinding or polishing wheel 54 is mounted on its other end adjacent to the bearing support 12. The support 12 normally centers the grinding wheel and holds it in such centrally disposed position. When the work W is applied thereto, the resistance heretofor described comes into play and resists the load against the wheel. During the grinding operation the wheel is held substantially free from undesirable vibrations and remains quite close to its normally centralized position, while at the same time resiliently resisting the loads thereagainst. Furthermore, this resistance is the same regardless of the direction of the load. The advantages resulting from the invention, relative to grinding or other useful applications, are believed to be obvious.

A very important and inherent property of my invention is its ability to act as a mechanical critical frequency changer for the production of very low critical speeds of rotors mounted thereon. This new and very desirable accomplishment in engineering is due to the inertia of member 10 when oscillating in a spacial manner combined with the use of relatively flexible spring members 14 and 15, while at the same time, the structure possesses the necessary rigidity to prevent undesirable radial deflection. For a given radial deflection, my invention can produce lower critical frequencies than have been heretofore possible.

I may herein briefly describe certain principles of my invention as follows: I base my construction on principles of both three-dimensional mathematics and mechanics, in contradistinction to methods of construction which are fundamentally operative in space of two dimensions only. By embodying the advantages of symmetry in three-dimensional space, I render my invention adaptable for purposes of stabilization in balancing disturbing forces in any and all directions in space.

For the preferred embodiment of the invention, I make use of the principles of symmetry involved in the elementary geometrical figure, the regular tetrahedron. The inscribed sphere of a regular tetrahedron is tangent to the four faces at points which are equidistant from one another on the surface of the inscribed sphere. Also, the radius vectors to the four points of tangency form equal central angles with one another. At such equidistant points on member 10, are located the studs 18, to which the inner ends of elements 14 and 15 are attached. The outer ends of elements 14 and 15 are located preferably at points equidistant from the spherical center, along the aforesaid radius vectors extended. In the preferred arrangement, each of the elements 14 and 15 lies normally in a plane defined by two of the aforesaid radius vectors.

While I have herein more particularly illustrated and described the application of my invention to the supporting of a shaft or the like against lateral movement from its centralized position, it will be understood and appreciated that my improved bearing combination functions to resist movement of the shaft in any direction, axially or laterally, from the said position, all as hereinabove described.

Having thus described my invention, what I claim as new and desire to secure by Letters Patent is,—

1. A universal bearing support comprising an inner member, an outer member, and two pairs of diametrically opposed and elongated spring elements each having the two ends thereof connected to said two members respectively and in relatively spaced planes extending transversely through the members whereby to support the inner member for resilient universal movement about a normal centrally disposed position on and within the outer member, said inner member being supported solely by said elements.

2. The universal bearing support defined in claim 1 in which said elements extend in a helix-like direction between and relative to the two members.

3. The universal bearing support defined in claim 1 in which each of said elements extends in a helix-like direction between and relative to the two members and has the two ends thereof connected respectively to the two members at points substantially 90° apart around the longitudinal axis thereof.

4. The universal bearing support defined in claim 1 in which each of said elements has its two ends connected to the two members respectively at opposite sides of the longitudinal center thereof.

5. The universal bearing support defined in claim 1 in which each of said elements extends in a helix-like direction between and relative to the two members and has the two ends thereof connected respectively to the two members at points substantially 90° apart around the longitudinal axis thereof and to the two members respectively at opposite sides of the longitudinal center thereof.

6. A universal bearing support comprising an outer ring-like member, an inner ring-like member within the outer member, and four elongated spring elements between the members and equally spaced around the longitudinal axis thereof, the outer ends of two of the diametrically opposed elements being connected respectively at diametrically opposite points to one end of the outer member and the inner ends thereof being connected respectively at diametrically opposite points to the opposite end of the inner member, the other two elements being likewise connected to the members at the other ends thereof and 90° therefrom around the longitudinal axis of the members.

7. The universal bearing support defined in claim 6 in which said elements extend in like helix-like directions around the inner member and have the two ends of each element anchored 90° apart around the longitudinal axis of the inner member.

8. A universal bearing support comprising a ring-like member, a plurality of resilient elements extending in helix-like paths around and having the inner ends thereof attached to the member at equally distant points therearound and forming the sole support for the member, said elements normally supporting the member in a position disposed centrally of the elements and permitting restricted universal movement thereof from such position, and means anchoring the outer ends of the elements at fixed and predetermined points, each element extending only partially around the member and certain of the elements being attached to the member at one side of a plane extending transversely through the center thereof and the other elements being attached to the member at the other side of said plane.

9. A universal bearing support comprising a ring-like member, a plurality of resilient elements having the inner ends thereof attached to the member at opposite sides of the longitudinal center and adjacent to the two ends thereof and at relatively spaced and symmetrically disposed points therearound, said elements forming the sole support for the member and normally supporting the member in a position disposed centrally of the elements and permiting restricted universal movement thereof from such position, and means anchoring the outer ends of the elements at fixed and predetermined points, each element extending only partially around the member.

10. A universal bearing support comprising an inner member, an outer member, and a plurality of resilient elements disposed in helix-like lines around and normally supporting the inner member in a centrally disposed position on and within the outer member, each element extending only partially around the inner member and having its two ends respectively connected to the inner and outer members at opposite sides of a plane extending transversely through the members, and certain of the elements being connected to the inner member at one side of said plane and the other elements being connected to the inner member at the other side thereof whereby uniformly and resiliently to resist movement of the inner member in all directions away from said centrally disposed position.

11. The combination defined in claim 10 plus a bearing for a shaft or the like supported on and within the inner member, and means mounting the bearing for universal movement on and within the inner member.

CLIFFORD B. CRONAN.